United States Patent
Gendron et al.

(10) Patent No.: US 6,218,965 B1
(45) Date of Patent: Apr. 17, 2001

(54) MOVING MAP COMPOSER (MMC)

(75) Inventors: Marlin L. Gendron; Perry B. Wischow, both of Christian; Michael E. Trenchard, Slidell; Maura C. Lohrenz, Pearl River; Lancelot M. Riedlinger, Slidell, all of LA (US); J. Michelle Mehaffey, Diamondhead, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/126,386

(22) Filed: Jul. 30, 1998

(51) Int. Cl.$^7$ .................................................. G06F 165/00
(52) U.S. Cl. ......................... 340/995; 701/200; 701/208; 701/213
(58) Field of Search ..................... 345/423, 425, 345/428, 430, 441; 340/990, 995; 701/200, 208, 213

(56) References Cited

U.S. PATENT DOCUMENTS

| | | | |
|---|---|---|---|
| 4,484,192 | * 11/1984 | Seitz et al. ............................. | 340/995 |
| 4,625,288 | 11/1986 | Weiner et al. ......................... | 364/521 |
| 5,463,723 | 10/1995 | Saha ....................................... | 395/134 |
| 5,884,219 | * 3/1999 | Curtwright et al. ................... | 701/213 |

OTHER PUBLICATIONS

Lohrenz et al.; Compression of Scanned Aeronautical Chart Data in Support of Naval Aircraft Digital Moving Map Systems; IEEE Data Compr. Conf., Snowbird, UT; Apr. 1991.

Lohrenz et al.; The Navy Tessellated Spheriod Map Projection System: A Comprehensive Definition; NRL RPT. No. NL/FR/7741–92–9408; Aug. 11, 1993.

* cited by examiner

Primary Examiner—Mark K. Zimmerman
Assistant Examiner—Kimbinh T. Nguyen
(74) Attorney, Agent, or Firm—Barry A. Edelberg; Charles J. Stockstill

(57) ABSTRACT

The moving map composer (MMC) is a device that allows a user to manipulate different sources of map data into a single map for presentation on a display. The MMC has an ability to extract a predetermined area of map coverage defined by sets of latitude and longitude points, or non-orthogonal areas of map coverage, the smallest of which is a segment. A bitmap is a representation of an available map coverage for a given area selected by a user having a "set", or "1" bit to indicate a segment is present, and a "clear", or "0" bit to indicate a segment is missing. The size of the bitmap is determined dynamically to assure a two-bit buffer zone of clear bits around a polygon's maximum extent. If the user selected polygon crosses one or more maps, the polygon is subdivided into several new polygons. Once the total map coverage desired has been defined, what available map sources are determined and the resulting subset is displayed, if the resulting coverage is acceptable, the user may transfer the data to the display.

3 Claims, 15 Drawing Sheets

BIT (1,1)
SEED FOR FLOOD-FILL ROUTINE

MOVING MAP COMPOSER (MMC)

BACKGROUND OF THE INVENTION

1. Field of the Invention

This invention pertains generally to a method and apparatus for displaying a selected geographic area on a video display and more specifically to the providing of a user-friendly graphical interface that defines a template and builds an aircraft optical disk image (AODI) from the data available within the given template's boundaries.

2. Description of the Related Art

The current techniques for defining and building an aircraft optical disk image (AODI) utilizes a specialized computer system to define and build map coverages. An AODI is an image file consisting of several groups, or subdirectories, of map tiles, or segments, that are arranged in hash tables. Each subdirectory is identified in an AODI superdirectory by its map scale and zone, and its starting address.

Rectangles are used to define the bounds of an area of desired coverage. If a nonrectangular area of coverage is desired, the current technique can only approximate the coverage. This is accomplished by using multiple rectangles of varying size. This technique does not provide an accuracy check to verify the exact latitude/longitude or row/column extent of the coverage. The extent of the AODI coverage is estimated by interpolating between the edges of the AODI coverage and the latitude/longitude markings on a base map. Although an approximated outline of the coverage bounds is available utilizing the current techniques, this outline reflects neither missing segments in the data nor does it show individual segments. Further, current techniques are capable of only defining map coverage in non-polar regions (below 51° N and above 51° S).

Present technology is capable of calculating the size of an individual subdirectory of an AODI. However, there is no current capability to determine the complete AODI size before writing the individual subdirectories to the aircraft optical disk (AOD). This reduces the ability to fully utilize all of the AOD space when a margin of error is included in the computations. Neither can polar data be defined, viewed, or created with the current mapstation technology. Although areas of coverage can be deleted or modified using the previously discussed rectangular method, there is no method of precisely adding or deleting individual segments within a coverage.

If two data sources overlap and one of the sources is more current than the other, the current technology does not provide a means for controlling the order in which the data sources are selected for an AODI build. Once entered into a database, the data sources are stagnant and cannot be changed or replaced unless all data sources are relogged into the database. Utilizing current technology, each subdirectory is built, the subdirectory is written to the AOD, and then the subdirectory is erased from a computer hard disk and a new one built. The multiple subdirectories cannot be merged into a single AODI or saved to a computer hard disk.

SUMMARY OF THE INVENTION

The object of this invention is to provide an apparatus that can manipulate geographic data sets without directly handling the data itself.

Another objective of this invention is to provide a map display capable of being used in the polar regions above 51° N and below 51° S).

This and other objectives are accomplished by the moving map composer (MMC)which allows a user to manipulate different sources of map data into a single map for presentation on a display. The MMC has an ability to extract a predetermined area of map coverage defined by sets of latitude and longitude points, rows and columns, or non-orthogonal areas of map coverage, the smallest of which is a segment. A bitmap is a representation of an available map coverage for a given area selected by a user by having a "set", or "1" bit to indicate a segment is present, and a "clear", or "0" bit to indicate a segment is missing. The size of the bitmap is determined dynamically to assure a two-bit buffer zone of clear bits around a polygon's maximum extent. If the user selected polygon crosses one or more map zones, the polygon is subdivided into several new polygons. Once the total map coverage desired has been defined, the available map sources are determined and the resulting subset is displayed, if the resulting coverage is acceptable, the user may transfer the data to the display.

BRIEF DESCRIPTION OF THE DRAWINGS

FIG. 8 is a flow chart showing how each bit in the bitmap corresponding to an available tile is turned on.

FIG. 9 shows a depiction of the edge bits of the polygon turned ON.

FIG. 10 shows a depiction of the edge bits of the bitmap turned ON.

DESCRIPTION OF THE PREFERRED EMBODIMENT

Figure 1:
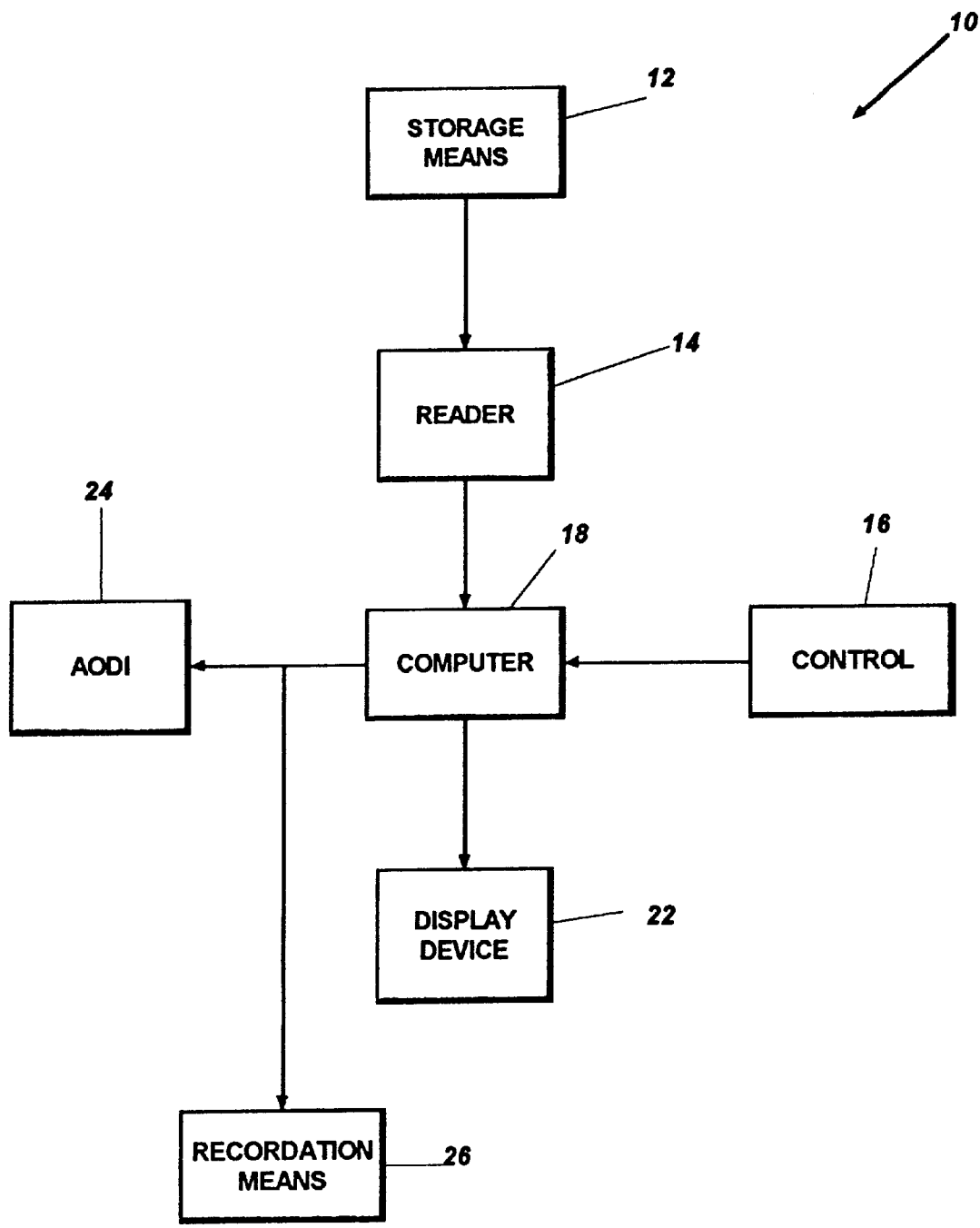
FIG. 1 shows a functional block diagram of the moving map composer system.

A moving map composer (MMC) 10, as shown in FIG. 1, wherein the user is allowed to manipulate different sources of map data into a single aircraft optical disk interface (AODI) 24. The algorithm contained within MMC 10 stores terrestrial mapping representations of available tiled data at pre-selected scales of worldwide coverage. By extracting only desired tiles (represented by user defined bitmaps), MMC 10 constructs a data image for specific areas of interest. MMC 10 uses its own specially designed bitmaps to represent the smallest indivisible unit (often referred to as a "segment" or "tile") of digitally scanned, geo-referenced map data and to depict the relationship between the units in a given data set. Arranged and grouped by the user, these units or segments graphically create an image by allowing the user to design polygons representing relatively large areas or to add or subtract individual tiles from a bitmap in memory.

Although MMC 10 was originally developed to build AODI's for a moving-map display in a specific aircraft, it can readily be applied to any system that requires raster or gridded map data. Available predetermined area representations of map coverages via bitmaps stored in a first storage means 12, such as a CD-ROM, magneto-optical device, computer hard disk, or a magnetic tape, in a digital format, are read by a reader 14. The areas read by the reader 14 are defined by sets of latitude and longitude points, rows and columns, or non-orthogonal areas of map coverage manually selected, and consist of many map data files. The smallest element of map coverage is a single map data file, known as a segment, which consists of 256×256 picture elements, or pixels. A bitmap is used to represent an available map coverage for a given area having a "set", or "1" bit indicates a segment is present and a "clear", or "0" bit indicating a segment is missing. This may be accomplished utilizing a computer language such as "C"-based X-Windows/MOTIF. In such a program, the bitmaps are "C" bit structures, allocated contiguously. The size of the bitmap is determined dynamically to assure a two-bit buffer zone of clear bits around a maximum extent of a polygon. The two-bit buffer zone allows the MMC 10 to traverse through the true interior of the bitmap without encountering an "edge" bit (a set bit indicating a segment on the extreme of the bitmap). Therefore, each bitmap can be equated to a row/column or latitude/longitude pair.

Each digital bitmap, also called a template, stored in the storage means 12, is identified by a source identification for the data retrieval. The first sixteen bytes in each bitmap identifies the four bounding vertices of a bitmap. The minimum and maximum row/column are listed as long words of four bytes each. If the minimum column is greater than the maximum column, this indicates that the data crosses 180 degrees longitude. Following the first sixteen bytes in a bitmap is an array of "C" bit structures identifying the status (either present or missing) of all of the segments within the bounding vertices.

The preferred polygon selection means 16 for setting forth the bounds of a desired map coverage is a computer "mouse" input device, however, other forms of input devices such as a computer keyboard may be used. The preferred method of polygon selection is known as the "draw polygon" feature. The preferred base map database for the "draw polygon" feature is the World Vector Shoreline (WVS) which allows a display as either the polar or Mercator projections, however, any form of mapping technique may be utilized. The WVS base map is subdivided into map zones and zone bounds to be used are defined by the map database being used (in this case, Compressed Aeronautical Chart developed by the Map Data Formatting Facility (MDFF) at the Naval Research Laboratory (NRL), Washington, DC.; SEE, Lohrenz et al., *THE NAVY TESSELLATED SPHEROID MAP PROJECTION SYSTEM: A COMPREHENSIVE DEFINITION*, N.L./FR/7741—92—9408, Aug, 11, 1993). However, these map zones are transparent to the user. If the user inputs a polygon that crosses one or more map zones, the MMC 10 automatically subdivides the polygon into several new polygons—one per map zone. When the MMC 10 has subdivided a polygon, a list of polygon vertices for each applicable map zone is built. A computer 18 then uses each list of polygon vertices to set bits for an AODI 24 build, according to the scale of the map data selected, using a recursive flood-fill algorithm.

Once the total map coverage desired by the user has been defined, the MMC 10 determines what available map data sources fall within the desired map coverage area. The resulting subset of available coverage is displayed on a display means 22, such as a video monitor. If the resulting coverage is acceptable to the user, the user can transfer the data to an AODI 24.

This invention allows a user to specify orthogonal or non-orthogonal coverages using latitude/longitude pairs entered via the keyboard or by utilizing a "mouse" 16. Coverages defined via the mouse are created by clicking the vertices of any desired polygon or by an orthogonal stretch box. With strict size limitations of the AODI 24, design time is minimized and AODI 24 space limitations can be minimized. Once the vertices of the desired coverage have been input, the MMC 10 can determine the exact latitude/longitude or row/column extent of the coverage and any missing segments within the coverage bounds are reflected. The exact size of the AODI 24 can be calculated at any time. Therefore, any adjustments due to size limitations can be corrected before proceeding with the task of the MMC 10 build. Polar data can be defined, viewed, and created using all of the available methods employed by MMC 10 and at any time during the design phase, segments in the desired map coverage may be added or deleted.

MMC 10 allows the user to select the order of map sources utilized in the building of the AODI 24. In this way, updated map segments may be used in place of older map segments of the same coverage. However, the invention is flexible enough to allow the user to select the older map segments if desired. The MMC 10 allows for the creation of hard copies through the use of a recordation means 26, such as a printer. The printout may include such items as the creation date, AODI 24 name, aircraft optical display (AOD) identification, map scale, and AOD side. Also the latitude/longitude grid interval may be provided on the printout. However, the final AODI 24 is plotted with individual segments against a world map (WVS) background. Multiple AODIs 24 may be merged into a single AODI 24 (prior to final build) within the MMC 10. MMC 10 uses two fundamental types of bitmaps: actual-data bitmaps and user defined bitmaps. Actual-data bitmaps are exact representations of existing digital map data, (e.g. all available coverage of Digital Terrain Elevation Data in a specific geographic region). Segments in an actual-data bitmap are stored as geo-referenced map data on a CD-ROM, or other data-storage device 12. User-defined bitmaps are desired areas of coverage, which MMC 10 converts to bitmaps when AND-ing them with actual-data bitmaps. The algorithm keeps track of the data sets that comprise each bitmap and allows the user to add new data sets or delete existing ones. The algorithm provides continuous file-size information while the user is custom-building areas of digital map data, as well as a complete summary of the final image.

Zoom functions and overlays, such as World Vector Shoreline (WVS) and political boundaries from the National Imagery and Mapping Agency (NIMA) support the image design process. MMC 10 uses these products to display a world map over which the user can specify the area(s) of interest by either entering precise latitude and longitude coordinates, boxing in a rectangular area, or drawing a polygon area. MMC 10 allows the user to define these areas independent of any geographical zones that might be inherent in the source data (e.g., Polar, Temperate, and Equatorial zones in various scanned map data sets). These zones are transparent to the user, so areas of interest do not need to be defined on a zone-by-zone basis.

The MMC 10 graphical user interface (GUI) efficiently and accurately represents both available and requested map data coverages. An important step towards building a final image is prompting the user to extract predetermined areas of interest from a global data set and then incorporating these areas into the final image. The area of interest may not always be a subset of the map data available. For this reason, MMC 10 maintains bitmaps of all available data in order to decide which desired map data segments exist and which do not. The area may contain data from one or more map data sources. MMC 10 keeps track of which map segments came from which data source and allows the user to add, subtract, and priortize data sources for the final image builds.

An integral part of the MMC 10 is the use of a dynamic one-dimensional structure of bits, indexed as a two-dimensional map, which is referred to as a bitmap. One bit location in the bitmap represents one map tile. Simply, if the bit is ON (set=1), then the map data tile is present, I.E., available on CD-ROM or some storage device. If the bitmap is OFF (set=0), then the tile is not available. The advantages of using bitmaps are that actual map data does not have to be manipulated or read until the final image is built, so the computer 18 memory and data storage requirements are extremely small during the design phase of an image build. Each bitmap has a total number of bits associated with it, defined by a total number of rows and a total number of columns. MMC 10 indexes the bitmap by each bit's row and column values, which are easily determined by a simple index formula. Before building a new bitmap, MMC 10 determines the range of map data to be represented as a minimum bounding rectangle (MBR). MMC 10 then creates an initial bitmap just large enough to hold this MBR plus a 2-bit buffer zone on all sides.

The bits within the 2-bit buffer zone will never represent actual map data, but they are present for two reasons: first, when all the bits in the buffer zone are OFF, the buffer zone prevents any algorithms from erroneously crossing the bounds of a bitmap, thereby eliminating the need for time-consuming bounds checking. Secondly, the buffer zone aids in the filling of polygons within the bitmap itself.

MMC 10 facilitates the building of polygons consisting of row and column tiles to create any shaped area of coverage. N−1 vertices of a given polygon are entered by either clicking on the desired point corresponding to a vertex, or entering the vertex's coordinate pairs [latitude, longitude]. Each vertex is processed by the algorithm and stored in a record that is added to a linklist containing all the vertices. The first vertex in the list corresponds to the first vertex entered by the user. The last vertex in the list, which is the same as the first, is not entered by the user. Instead, MMC 10 automatically places the last vertex in the list to close the polygon with a total of N vertices via a double mouse click at N−1. The vertex record contains the [latitude, longitude] values of the vertex and a crossing flag.

The crossing flag denotes whether any polygon lines cross 180 degree longitude. When the user selects the first vertex (V1) of a new polygon, that vertex's crossing flag (F1) is assigned a value of 0. When the user selects the second vertex V2), MMC 10 determines whether the vector V1—V2 crosses 180 degree longitude. If it does not, the F2 (the crossing flag for V2) is given the same value as F1 (in this case 0). If the vector does not cross 180 degrees, then F2 is "toggled" and given a value that is the binary opposite of the preceding vertex's flag (in this case, F2 is toggled from 0 to 1). This process is repeated for each vertex in the polygon (V1 through Vn), such that for any vertex Vx, if the vector V*−1—Vx does not cross 180 degrees longitude, then Fx=F *−1; otherwise, Fx=toggle (F*−1), where toggle (0)=1 and toggle (1)=0. Later, when traversing the list of vertices, if MMC 10 finds a difference between the crossing flags of two adjacent vertices, then a crossing has occurred; if not, then no crossing has occurred.

Once all n vertices of the desired polygon have been placed in the link-list with the correct crossing flags, a routine is called to fill in the polygon. The polygon is filled by first "setting" the edge bits of the user-defined shape, where "setting" a bit means assigning it a value of 1 (the default pre-set value is 0). Next, all the outermost bits of the buffer zone surrounding the polygons MBR are set. Every other bit in the bitmap should be 0.

Next a recursive flood-fill algorithm is used to set all the bits between the shape's edge bits and the outermost edge bits. The bit in location [1,1], which is one bit up from the first row and one bit from the first column, is used as the seed for the fill. This bit always lies within the buffer zone and is therefore never set prior to the flood-fill operation. All bits of the entire bitmap are then toggled. Finally, the polygon's edge bits are set again. This procedure produces a completely filled polygon every time, and the polygon can now be viewed on the display 22.

The CAC is derived from Defense Mapping Agency (DMA) ARC (Equal Arc-second Raster Chart) Digitized Raster Graphics (ADRG), which consists of full-color charts that have been scanned into 100-$\mu$m pixels. Each pixel consists of a red, green, and blue (RBG) component. The MDFF "downsamples" ADRG data from 100-$\mu$m (which provide an image resolution of 254 ppi (pixels per inch) to approximately 200-$\mu$m pixels (exactly 128 ppi), which results in a 4:1 reduction in data storage requirements. The lower resolution data are then color-compressed by a factor of 3:1 and, finally, spatially compressed by a factor of 4:1. (SEE, Lohrenz et al., *COMPRESSION OF SCANNED AERONAUTICAL CHART DATA IN SUPPORT OF NAVAL AIRCRAFT DIGITAL MOVING MAP SYSTEMS*, IEEE Data Compression Conference, Snowbird, Utah, April 1991.) The final CAC product represents a data storage compression of 48:1 over the original ADRG.

CAC is stored in a seamless, global database; for example, a CD-ROM, such that the transition from one source chart to another is transparent to the pilot. The data are stored in discrete 51 mm$^2$ (2 in.$^2$) sections of chart, called tessellations or segments, which cover the entire globe; the model is known as a Tessellated Sphere. Approximately four chart segments may be projected onto one digital moving map display at one time. SEE, Lohrenz et al., *THE NAVY TESSELLATED SPHEROID MAP PROJECTION SYSTEM: A COMPREHENSIVE DEFINITION*, N.L./FR/7741—92—9408, Aug, 11, 1993) which is hereby incorporated, in total, by reference, into this document.

Figure 2:
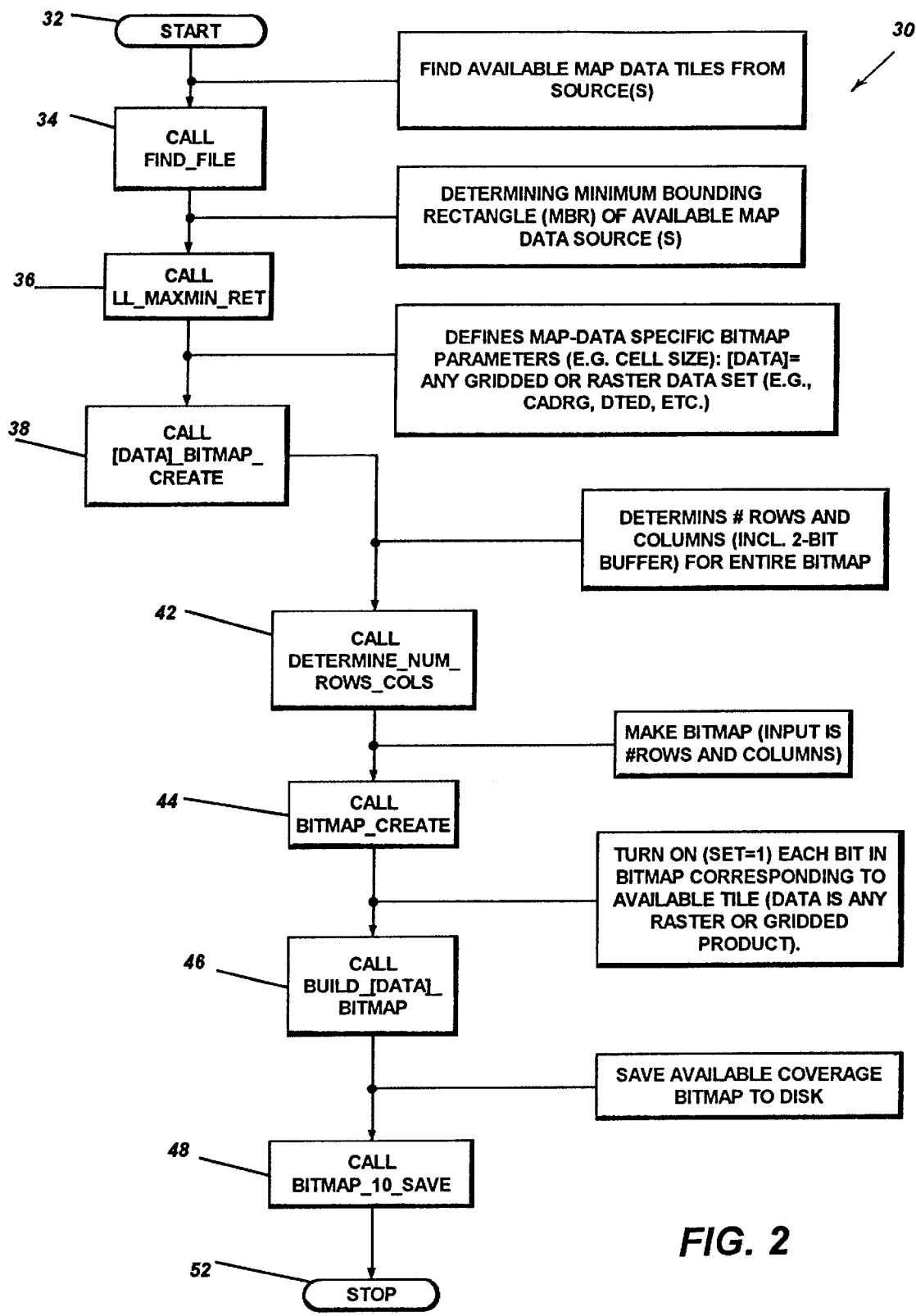
FIG. 2 shows a flow chart of the construction of a bitmap.

Construction of the bitmaps is accomplished by retrieving the CAC information from the seamless, global database utilizing the Log Available Coverage program 30, as shown in FIG. 2. Upon starting the program 32, the FIND_FILE 34 operation finds the available map data files from the seamless, global database stored in an off-line source. The LL_MAXMIN_RET 36 operation determines the latitude and longitude of the data by determining the minimum bounding rectangle (MBR) of the available map data sources. A bitmap large enough to hold the data is then created in the [DATA]_BITMAP CREATE function 38 wherein the map data specific bitmap parameters (e.g., cell size): [Data]=any gridded or raster data set (e.g., CADRG, DTED, etc.) are defined. From this information, the DETERMINE_NUM_ROWS_COLS function 42 is used to determine the number of rows and columns (including the 2-bit buffer) for the entire bitmap. The bitmap is then created inside the BITMAP_CREATE FUNCTION 44 by allocating memory. All of the bits in the bitmap that correspond to the available tile data (data is any raster or gridded product) are turned on (Set≈1) by the BUILD[DATA]_BITMAP function 46. The bitmap is then saved to a storage device by the BITMAP_IO_SAVE FUNCTION 48. Once the bitmap has been saved, the operation is stopped 52 until it is required by the user.

Figure 3:
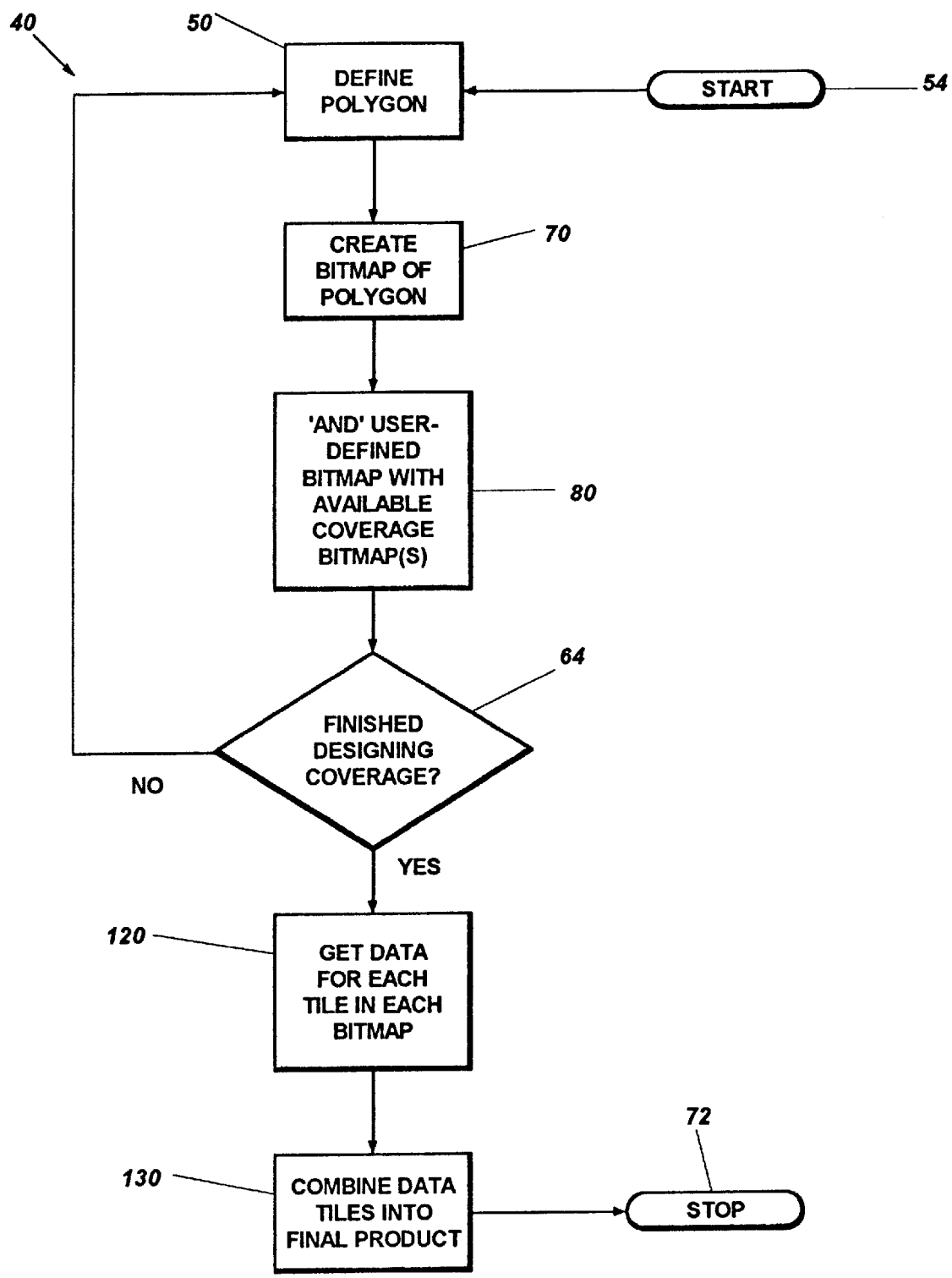
FIG. 3 shows a general operational flow chart of the moving map composer.

A general operation of,the algorithm within the MMC 10, as shown in FIG. 3, begins with the user starting the program 54 by defining the desired polygon in the DEFINE POLYGON function 50 by "pointing and clicking" on a base map screen the points forming the exact coverage desired. This may be a random point-to-point section, a rectangle, latitude and longitude, or any multiple points. A CREATE BITMAP OF POLYGON function 70 sets (Set≈1) all the tiles within the defined polygon thereby creating the selected bitmap. The tiles actually available are entered into memory, tiles that are not available may be those not defined in the storage medium by a bitmap, such as ocean areas or land masses where no map data is available in a usable format (those areas where no data in a raster data base are available). The calling of the tiles from on-line or off-line memory allows for minimum storage for bitmaps within the operational system forming the MMC 10 system. The 'AND' USER-DEFINED BITMAP WITH AVAILABLE COVERAGE BITMAP(S) function 90 looks at each bit representation of a tile. If the tile is present the bit will be kept (set to "1"). If not available, the bit will be cleared, or set to "0". The algorithm only keeps the polygon bits for which data is available. If more coverage or importation of additional bitmaps is desired, the "YES" function of FINISHED DESIGNING COVERAGE 64 returns the program to the DEFINE POLYGON function 56. The information obtained by this operation is data independent. The additional coverage desired may be of a different scale, area, etc. If no additional coverage is desired, each bit forming the polygon obtained from the storage medium (tiles or raster data cells) are obtained and made resident in the GET DATA FOR EACH TILE IN EACH BITMAP function 100. The tiles are combined as a final product by the COMBINE DATA TILES INTO FINAL PRODUCT function 110 in the aircraft optical disk, a mission planning data base, or displayed on a display device 22. The algorithm then ceases operation with the STOP function 72.

The size of the area described within the polygon is not important, neither is the scale of the retrieved information, it may be multiple layers of tiles of different scales of data pertaining to the same location.

Figure 4:
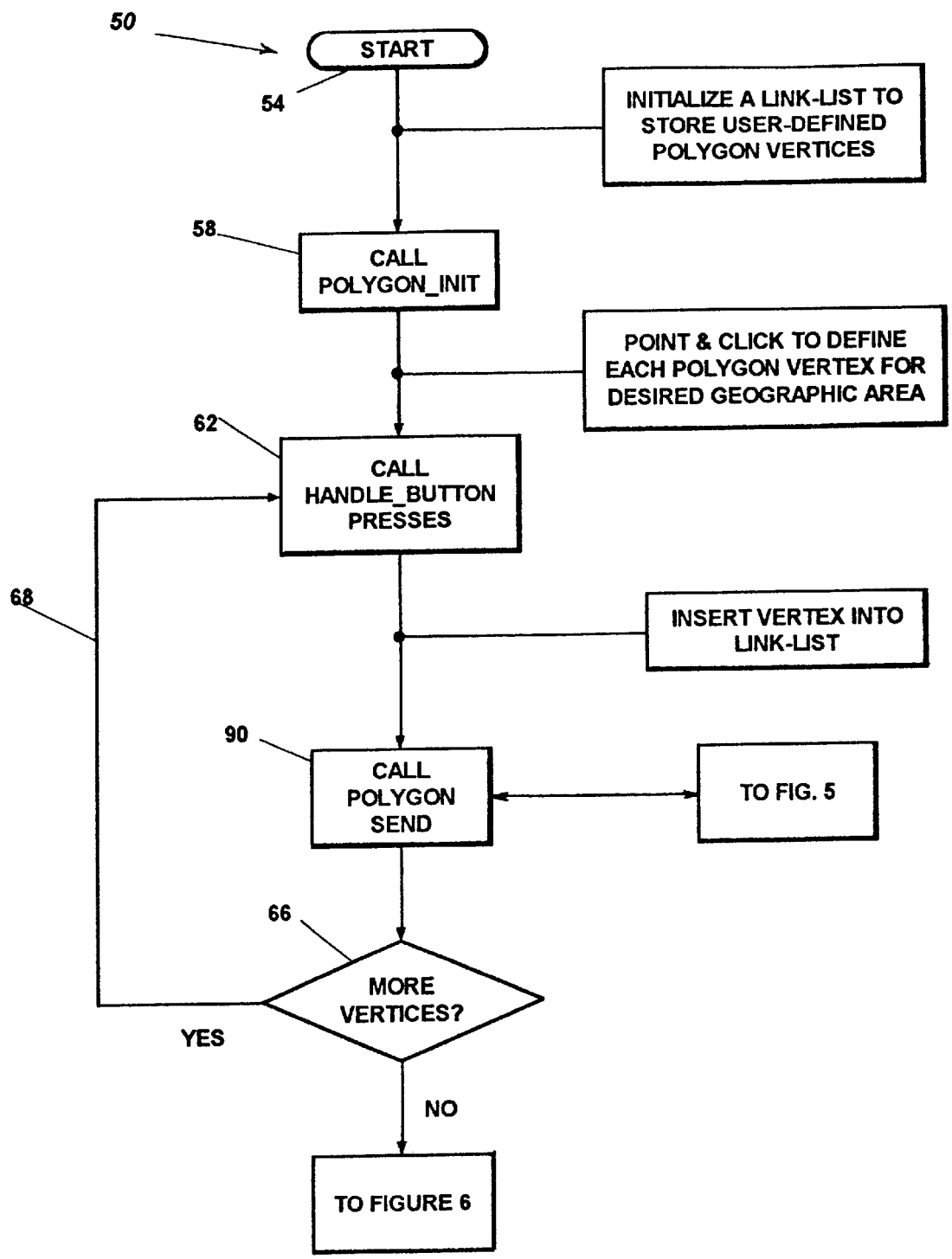
FIG. 4 shows how to create a bitmap of the polygon.
Figure 5:
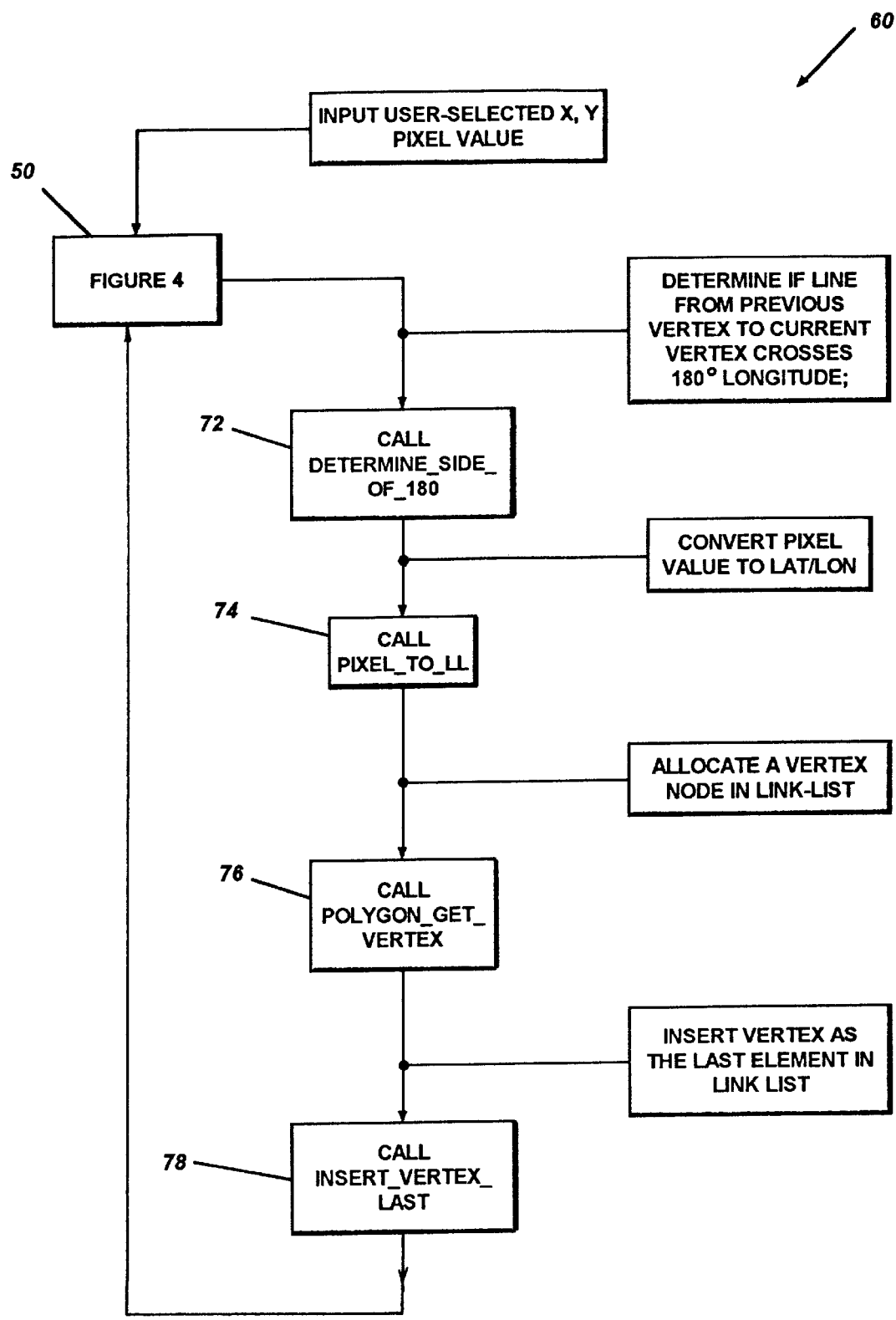
FIG. 5 is a flow chart showing how a vertex is input into a link-list.

Upon starting the program 54, the DEFINE POLYGON function 50 (as shown in FIG. 4) initializes a link-list to store user defined polygon vertices which links tile structures (nodes) together. The beginning of the list points to the first node which points to a second node, etc. As you add node you are dynamically adding memory. The number of nodes that may be linked together is only limited by the random access memory (RAM). The position of a vertex of a polygon is defined in the HANDLE_BUTTON_PRESSES function 62 by its latitude/longitude position. The user identifies a vertex of a polygon by "pointing" and "clicking" or by entering the desired latitude/longitude of the vertex.

Once the coverage of the polygon has been defined by the user, the vertex is inserted into the link-list in the POLYGON_SEND function 90.

Each vertex is inserted into the link-list within the POLYGON_SEND function 90. The X-Y pixel, or latitude/longitude values are input to the POLYGON_SEND function 68 (as shown in FIG. 4) and then processed in a CALL DETERMINE_SIDE_OF_180 function 72 to determine if the line from the previous vertex to the current vertex crosses 180° longitude. If the user has selected one side of 180° (the left) the algorithm arbitrarily assigns a "0" value to the bit, if the user has selected the other side of 180° (right) the bit is toggled to a "1". The algorithm then knows which side of the 180° longitude the reference point refers to by the appearance of a "0" or "1" bit. If there is no crossing of the 180°, the bit retains its original value. The pixel is then converted to latitude/longitude by the PIXEL_TO_LL function 74 converting the screen X-Y pixel location to a reference point that relates to the bitmap. Nodes are then allocated in the link-list and the values of the DETERMINE_SIDE_OF_180° function 72 and PIXEL_TO_LL function 74 are inserted into the algorithm in a POLYGON_GET_VERTEX function 76. The vertex comprising the last element in the link-list is then inserted in a INSERT_VERTEX_LAST function 78 and the computation sequence of the POLYGON_SEND function 90 is completed. If more vertices are desired to expand or contract the size of the previously selected polygon 66 the program is referred back to the HANDLE_BUTTON_PRESSES function 62 for redefinition of the polygon and thereby making the wants of the user more definitive.

Figure 6:
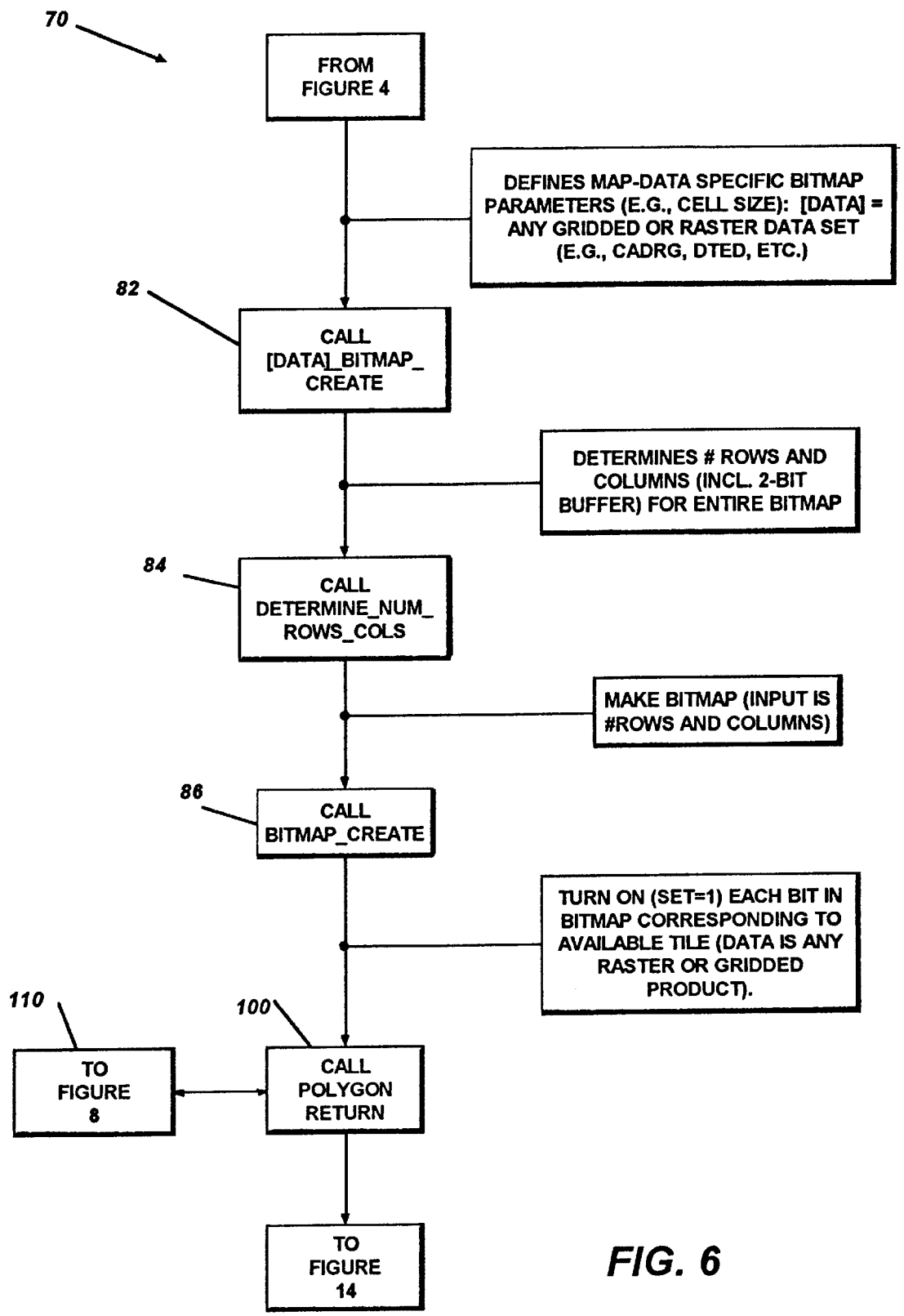
FIG. 6 is a flow chart showing how to create a bitmap of a polygon.
Figure 7:
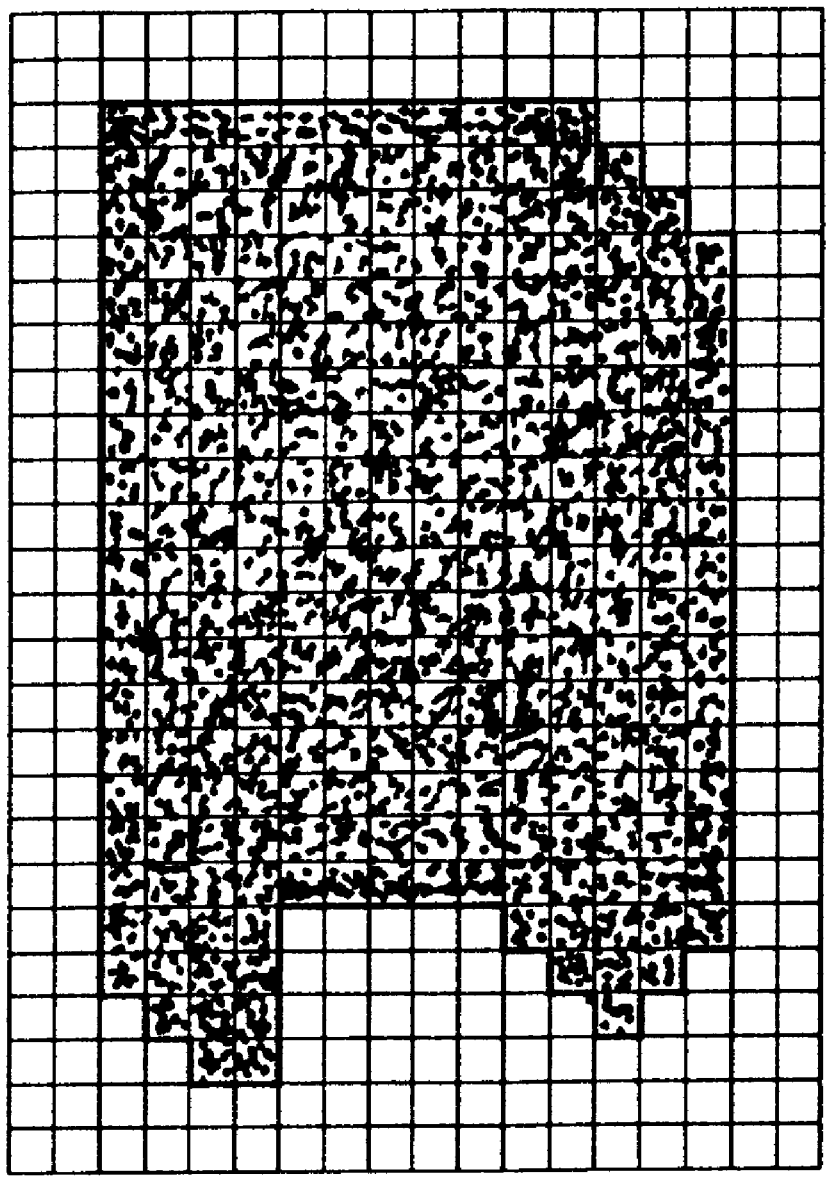
FIG. 7 shows a polygon with the selected bitmap coverage.

If no more vertices are desired, the sequence is passed to the CREATE BITMAP OF POLYGON function 70 where a bitmap is created that is large enough to accommodate the polygon in a [DATA]-BITMAP_CREATE function 82 (as shown in FIG. 6). This is done by determining the number of rows and columns based on the difference in latitude (ΔLat) and the change in longitude (ΔLong) within the selected polygon in a DETERMINE_NUM_ROWS_COLS function 84. The bitmap is then created from the numerical input of rows and columns in a BITMAP_CREATE function 86, as shown in FIG. 7.

Figure 8:
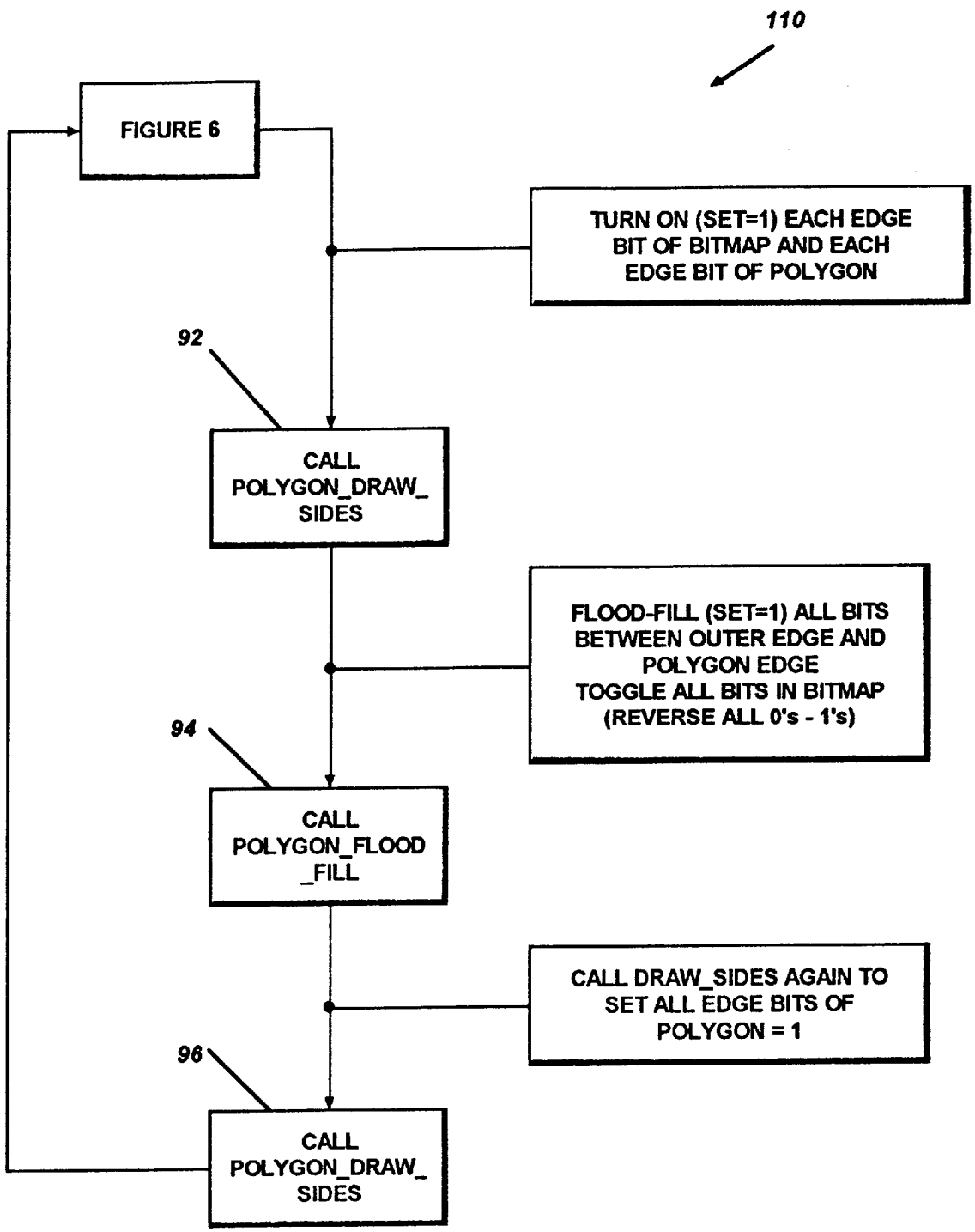
Figure 9:
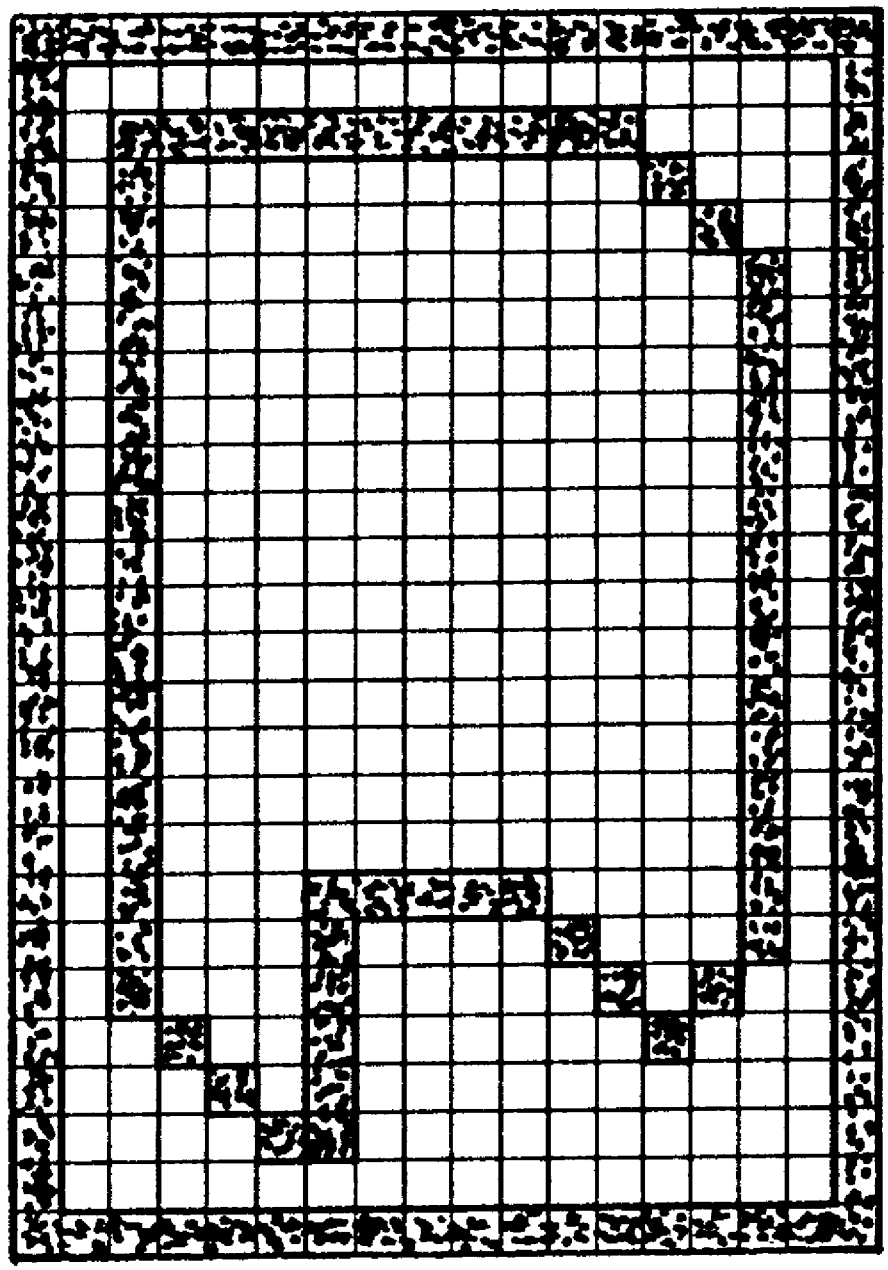
Figure 10:
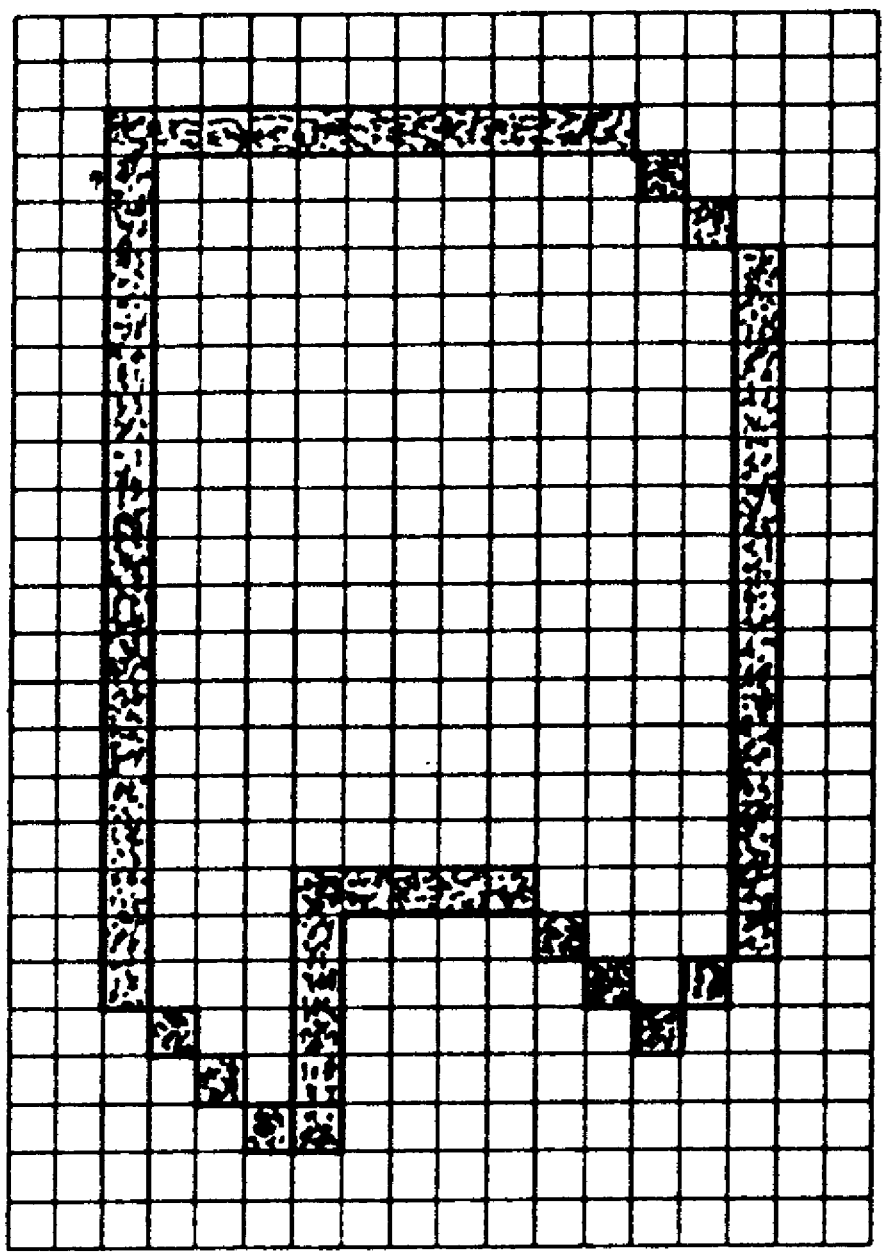
Figure 11:
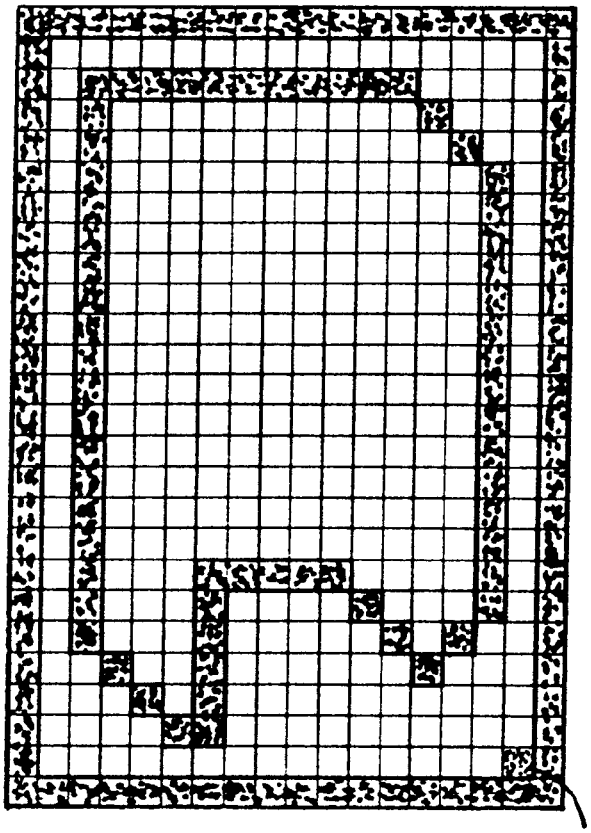
FIG. 11 shows a depiction of the seed bit for the flood-fill (set=1) of all bits between the outer edge and polygon edge.
Figure 12:
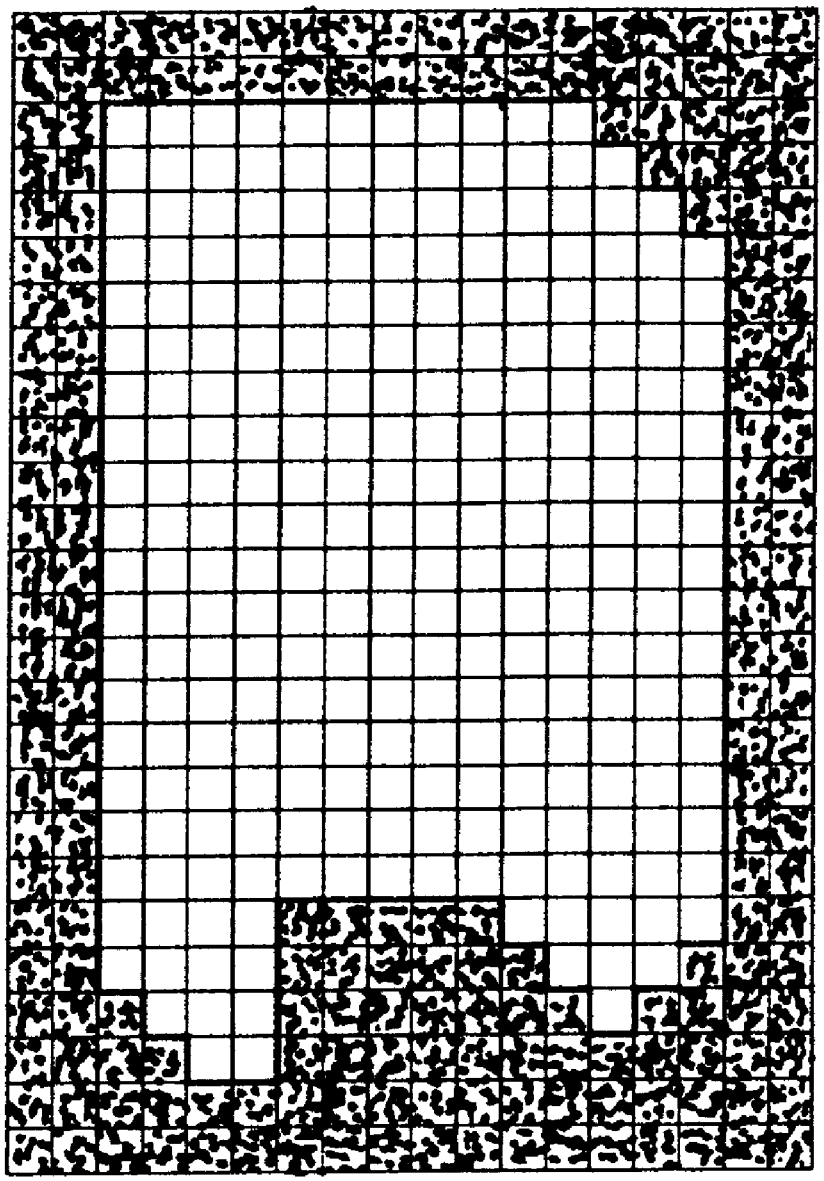
FIG. 12 shows the results of the flood-fill (set=1) of all bits between the outer edges and polygon edge.
Figure 13:
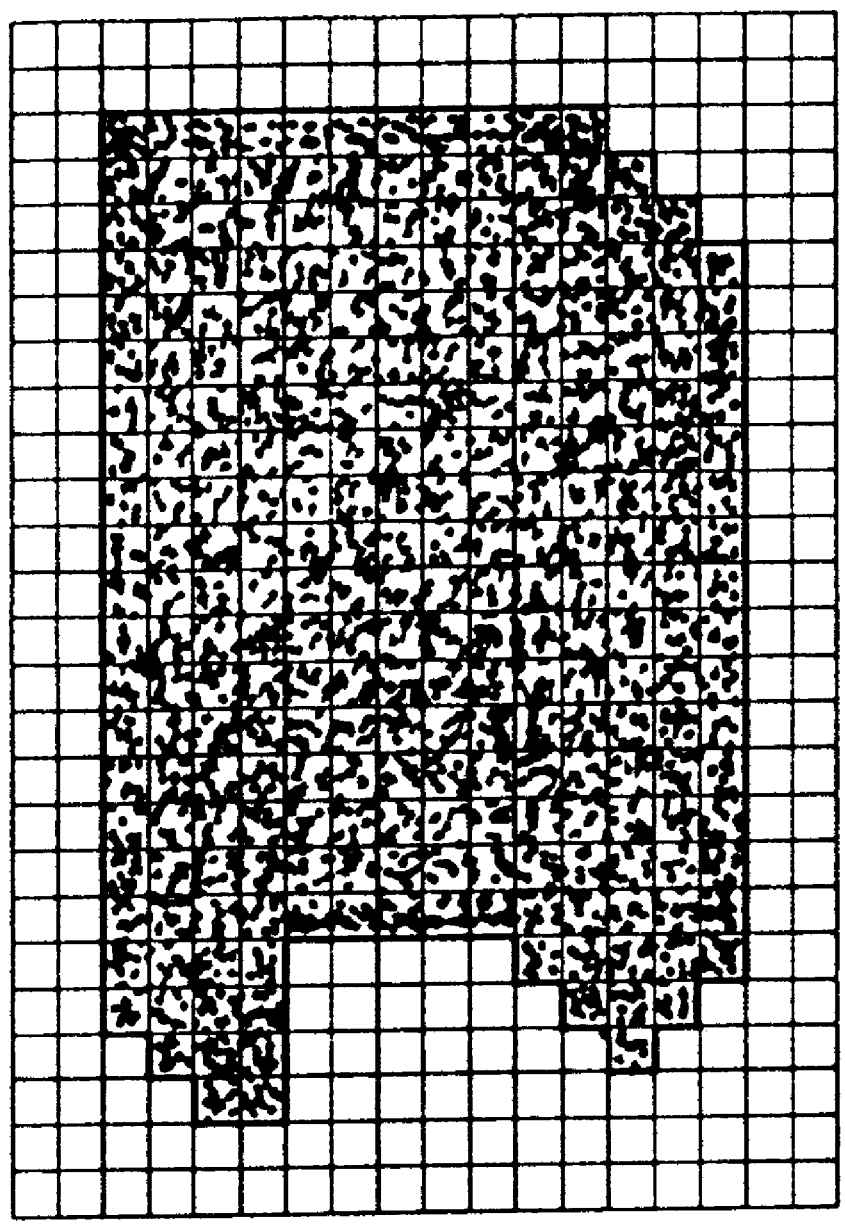
FIG. 13 shows the results of reversing all 0's to 1's and vice versa and re-setting the polygon edge bits to 1's.
Figure 14:
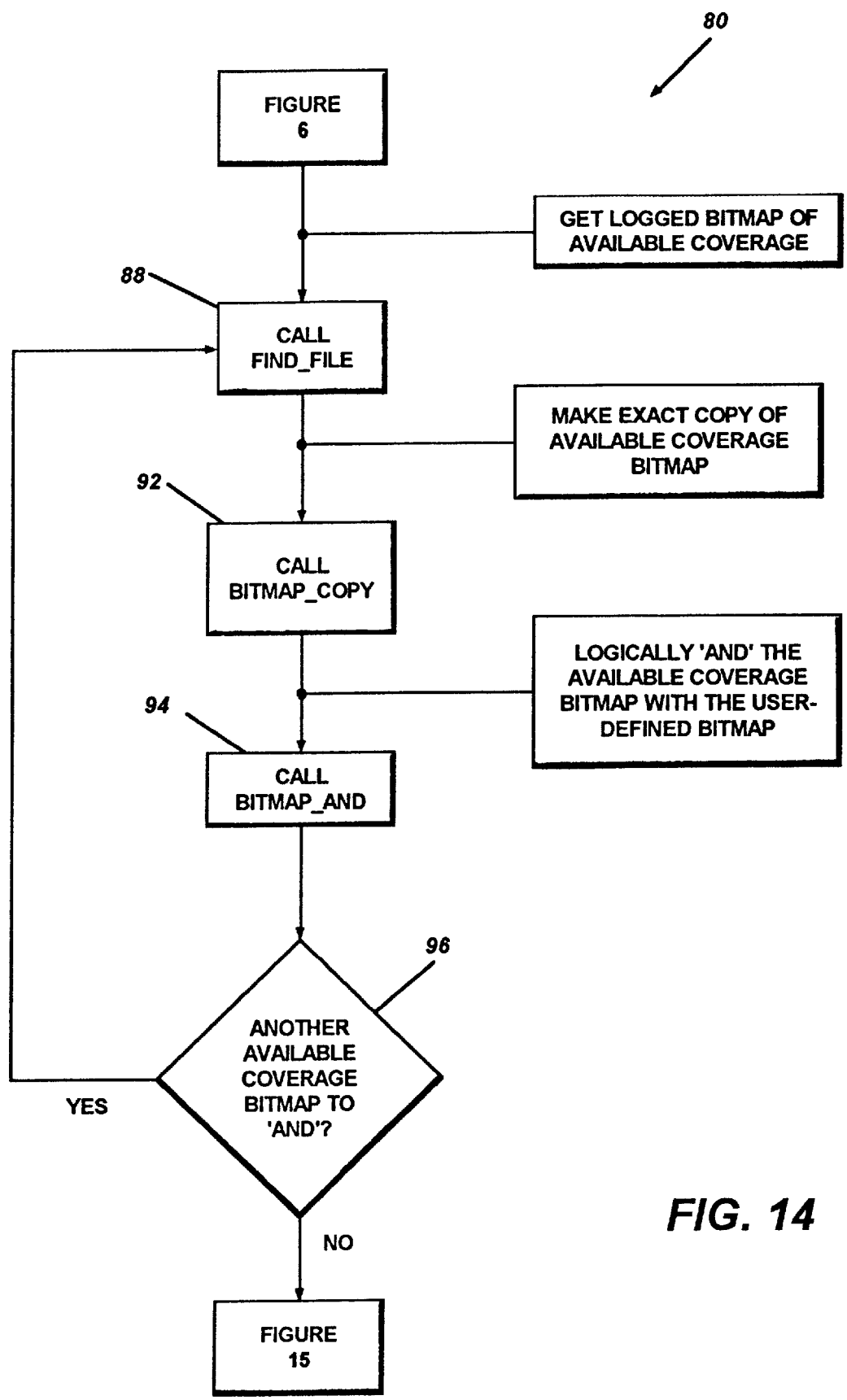
FIG. 14 is a flow chart of the 'and' user-defined bitmap and available coverage bitmaps.
Figure 15:
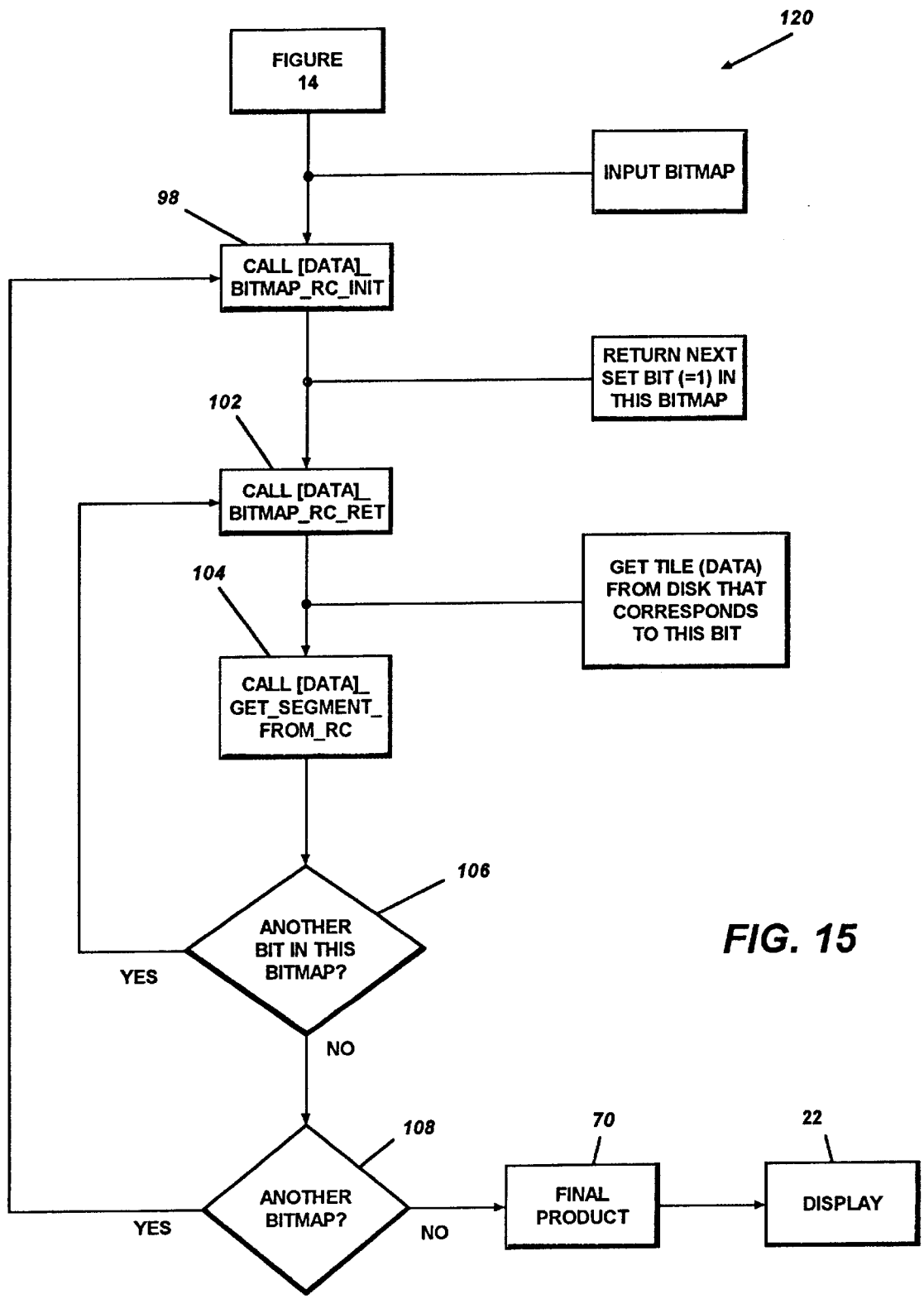
FIG. 15 is a flow chart of the get data for each tile in the bitmap and construction of the final product.

The bitmap corresponding to an available tile (data is any raster or gridded product) is then turned on (set=1) in a POLYGON_SIDES function 92, (as shown in FIG. 8) where the edge bits of the bitmap (as shown on FIG. 9) and the edge bits of the polygon (as shown in FIG. 10) are turned ON that correspond to the edge of the polygon in a POLYGON_DRAW_SIDES function 92. The two outermost bits (with the outermost bit set to 1) are drawn so as to create a space for the outer edge of the polygon. Then in the POLYGON_FLOOD_FILL function 94 the flood-fill is set at 1 for all bits between the outer edge (as shown in FIG. 11), this provided a fast and easy way to fill in the polygon without knowing any point inside of the polygon. Also, all bits are toggled in the bitmap (reverse all 0's and 1's) so as to reverse the polygon. Then the edge bits are redrawn in the CALL POLYGON_DRAW_SIDES function 96 and all edge bits of the polygon are set to 1. This results in a user-defined polygon bitmap with all required bits set to 1. When this operation is completed, the process is passed to the FIND_FILE function 88. The FIND_FILE function 88 finds all the available coverage bitmaps previously logged in MMC 10(See FIG. 2). The BITMAP_COPY FUNCTION 92 makes an exact copy of the user-defined polygon bitmap. The BITMAP_AND function 94 logically "AND's the copy of the user-defined polygon bitmaps with all the available coverage bitmaps found by the FIND_FILE function 88 (See FIG. 14). A logical "AND" 5turns off (OFF≈0) all bits that are not common between user defined and available bitmaps. Once the "AND"ing process is complete, the resulting bitmap may be input to a [DATA] BITMAP_RC_ INIT function 98 which actually goes and gets the data for each file input to the bitmap of available coverage. The algorithm returns the next set (=1) bit in the bitmap that are set, one at a time, in a [DATA]BITMAP_RC_RET function 102. In a [DATA]_GET_SEGMENT_FROM_RC function 104, the program goes to storage medium having the actual data and gets the tile (data) from the medium that corresponds to a particular bit in the final bitmap. Each bit in the final bitmap is processed via the [DATA]BITMAP_RC_RET function 102. After all bits of a bitmap are processed and another bitmap exists (108) then the sequence is returned to the [DATA]BITMAP RC INIT function 98. If no other bitmap exists, the data tiles are combined into a final product 70 and sent to a display means 22 for utilization by the user.

By storing only a representation of the available data and extracting only the required tiles, a means is provided for defining a coverage based upon a user selection. This allows large amounts of data to be represented in a very compact manner.

The advantages of this invention are that exact orthogonal or non-orthogonal coverage may be specified using latitude/longitude pairs entered via the keyboard or by utilizing the 'mouse'. With the strict size limitations on the airborne AOD, design time is minimized and the AOD space limitations may be minimized. Further, the exact size of a subdirectory, can be calculated at any time, therefore, any adjustments due to size limitations may be corrected before proceeding with the time-consuming task of the AOD image build. Polar data may be defined, viewed, and created using all of the available methods employed by the MMC 10. At any time during the design phase, segments in the desired map coverage may be added or deleted. MMC 10 allows the user to select the order of map sources used in the building of the AODI 24. In this way, updated map segments may be used in place of older map segments of the same coverage. However, the algorithm is flexible enough to allow the user to select the older map segments if desired. Any latitude/longitude grid interval may be chosen for a hard copy and plotted with individual segments against a world map (WVS) background.

This invention has been described in terms of an aeronautical environment, however, the principles set forth are applicable to such processes as inventory control or chemical processes to determine occurrences at certain points in the process, or any other application where raster information can be developed or is available. Those skilled in the art that still other variations.

Although the invention has been described in relation to an exemplary embodiment thereof, it will understood by those skilled in the art that still other variations and modifications can be affected in the preferred embodiment without detracting from the scope and spirit of the invention as described in the claims.

What is claimed is:

1. A moving map composer comprised of:
  means for storing a predetermined area representations of map coverages via bitmaps;
  a reader for reading the bitmaps contained in the storage means;
  means for controlling selection of the bitmaps from the storage means;
  a computer for
    defining an aircraft optical disk image (AODI) by drafting a polygon defining any coverage;
    determining the exact latitude/longitude and row/column extent of the coverage of the polygon;
    calculating the exact size of a subdirectory and calculating the AODI side;
    defining, viewing, and creating polar data;
    adding or deleting desired segments of map coverage;
    selecting the order of map sources used in building the AODI;
    creating printouts including creation date, AODI name, AODI identification, map scale and AOD side;
    selecting latitude/longitude grid intervals for
  printout and plot final AODI against a world map background;
    merging multiple AODI's into a single AODI; and
    producing a final AODI display;
  means for displaying the final produced by the AODI; and
  means for recording the AODI image generated by the computer.

2. A data bit stream for defining coverage for an aircraft optical disk comprised of:
  means for defining an aircraft optical disk image (AODI) by drafting a polygon defining any coverage;
  means for determining the exact latitude/longitude and row/column extent of the coverage of the polygon;
  means for calculating the exact size of a subdirectory and calculating the AODI side;
  means for defining, viewing, and creating polar data;
  means for adding or deleting desired segments of map coverage;
  means for selecting the order of map sources used in building the AODI;
  means for creating printouts including creation date, AODI name, AODI identification, map scale and AOD side;
  means for selecting latitude/longitude grid intervals for printout and plot final AODI against a world map background;
  means for merging multiple AODI's into a single AODI; and
  means for producing a final AODI display.

3. A method for building an aircraft optical disk image (AODI) from the data available within the given template's boundaries comprised of the steps of:
  storing a predetermined area representations of map coverages via bitmaps;
  reading the bitmaps contained in the storage means;
  controlling selection of the bitmaps from the storage means;
  defining an aircraft optical disk image (AODI) by drafting a polygon defining any coverage;
  determining the exact latitude/longitude and row/column extent of the coverage of the polygon;
  calculating the exact size of a subdirectory, set of subdirectories, an AODI side, and calculating the entire AODI;
  defining, viewing, and creating polar data;
  adding or deleting desired segments of map coverage as desired;
  selecting the order of map sources used in building the AODI;

creating printouts including creation date, AODI name, AODI identification, map scale and AOD side;
selecting latitude/longitude grid intervals for printout and plot final AODI against a world map background;
merging multiple AODI's into a single AODI; and
producing a final AODI display;
displaying the final produced by the AODI; and
recording the AODI image generated by the computer.

* * * * *